(12) United States Patent
Doering

(10) Patent No.: US 9,067,197 B2
(45) Date of Patent: Jun. 30, 2015

(54) CATALYST, PROCESS FOR PRODUCING THE CATALYST, USE OF THE CATALYST

(71) Applicant: MAN Truck & Bus AG, Munich (DE)

(72) Inventor: Andreas Doering, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 13/935,777

(22) Filed: Jul. 5, 2013

(65) Prior Publication Data

US 2014/0018234 A1    Jan. 16, 2014

(30) Foreign Application Priority Data

Jul. 5, 2012   (DE) .......................... 10 2012 013 288

(51) Int. Cl.

| | |
|---|---|
| *B01D 53/56* | (2006.01) |
| *B01J 21/00* | (2006.01) |
| *B01J 23/00* | (2006.01) |
| *B01J 23/40* | (2006.01) |
| *B01J 23/42* | (2006.01) |
| *B01J 23/44* | (2006.01) |
| *B01J 23/652* | (2006.01) |
| *B01J 21/06* | (2006.01) |
| *B01J 35/02* | (2006.01) |
| *B01D 53/94* | (2006.01) |

(52) U.S. Cl.
CPC ............ *B01J 23/6527* (2013.01); *B01J 21/063* (2013.01); *B01J 23/42* (2013.01); *B01J 35/023* (2013.01); *B01J 23/44* (2013.01); *B01D 53/944* (2013.01); *B01D 2255/1021* (2013.01); *B01D 2255/20707* (2013.01); *B01D 2255/20776* (2013.01); *B01D 2255/30* (2013.01); *B01D 2258/01* (2013.01)

(58) Field of Classification Search
CPC ............ B01J 23/30; B01J 23/42; B01J 23/44; B01J 23/56; B01J 23/6527; B01J 21/063; B01D 53/8628
USPC ......... 502/242, 254, 262, 309, 326, 339, 350; 423/239.1
See application file for complete search history.

(56) References Cited

U.S. PATENT DOCUMENTS

| | | | | |
|---|---|---|---|---|
| 7,521,392 | B1 * | 4/2009 | Kilic et al. ..................... | 502/327 |
| 7,521,394 | B2 * | 4/2009 | Xie et al. ....................... | 502/350 |
| 7,569,510 | B2 * | 8/2009 | Deevi et al. ................... | 502/240 |
| 7,608,560 | B2 * | 10/2009 | Fan et al. ...................... | 502/313 |
| 8,075,859 | B2 * | 12/2011 | Fu et al. ...................... | 423/239.1 |
| 8,304,365 | B2 * | 11/2012 | Shao et al. .................... | 502/313 |
| 8,309,489 | B2 * | 11/2012 | Roldan Cuenya et al. .... | 502/339 |
| 8,349,761 | B2 * | 1/2013 | Xia et al. ...................... | 502/240 |
| 8,415,267 | B2 * | 4/2013 | Lee ............................... | 502/242 |
| 8,450,236 | B2 * | 5/2013 | Fu et al. ........................ | 502/339 |
| 8,754,000 | B2 * | 6/2014 | Chan et al. .................... | 502/339 |
| 2011/0207602 | A1 * | 8/2011 | Xu et al. ....................... | 502/339 |

FOREIGN PATENT DOCUMENTS

| | | |
|---|---|---|
| DE | 10327030 A1 | 1/2005 |
| EP | 0341832 A2 | 11/1989 |
| EP | 1072765 A2 | 1/2001 |

* cited by examiner

*Primary Examiner* — Cam N. Nguyen
(74) *Attorney, Agent, or Firm* — Lucas & Mercanti, LLP

(57) ABSTRACT

A catalyst especially for oxidation of exhaust gas constituents, for example nitrogen oxide, preferably nitrogen monoxide, consists of a particulate support material composed of titanium-containing nanoparticles, preferably titanium oxide nanoparticles, especially titanium dioxide nanoparticles coated with platinum, especially platinum particles. A process for producing such a catalyst.

18 Claims, 3 Drawing Sheets

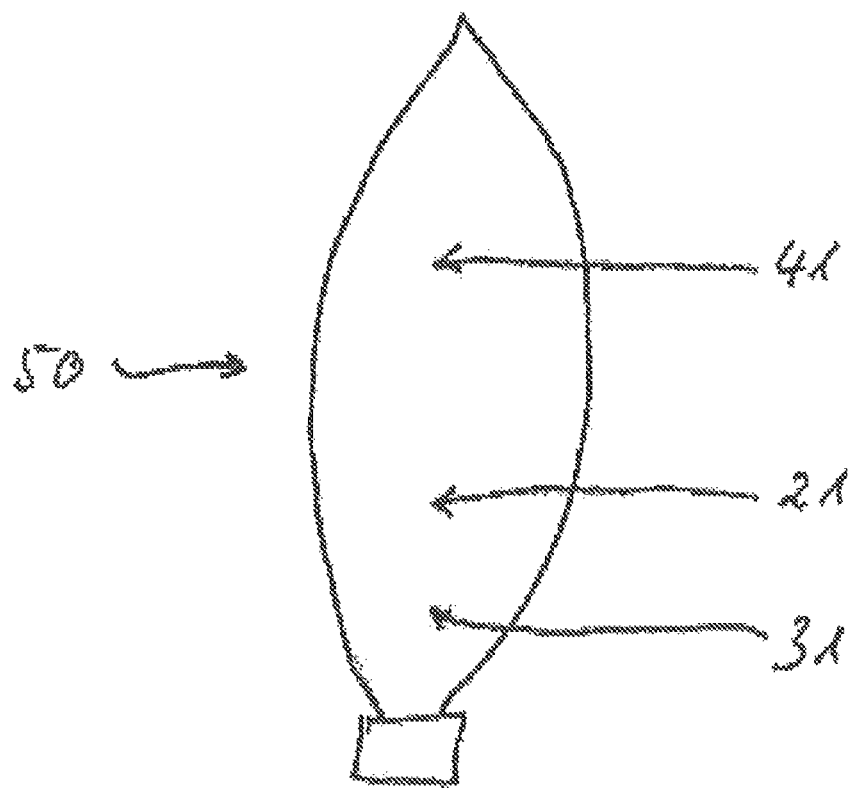

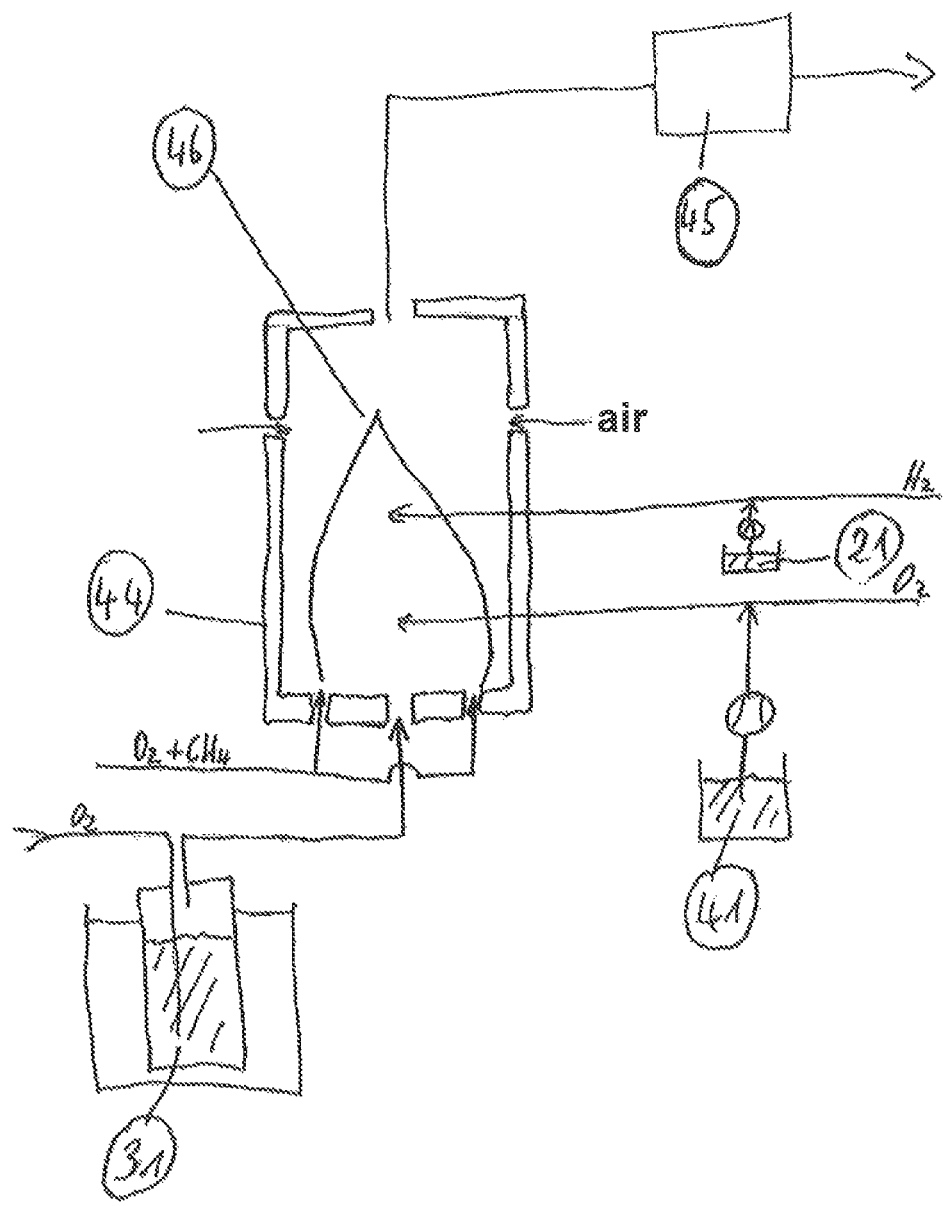

CATALYST, PROCESS FOR PRODUCING THE CATALYST, USE OF THE CATALYST

CROSS-REFERENCE TO RELATED APPLICATIONS

This application claims the priority of DE 10 2012 013 288.3 filed Jul. 5, 2012, which is incorporated by reference herein.

BACKGROUND OF THE INVENTION

The invention relates to a catalyst for oxidation of exhaust gas constituents, to a process for producing such a catalyst, to the are of an aforementioned catalyst, and to produced using such a catalyst.

Catalysts, especially for oxidation of exhaust gas constituents, have been known for some time and are used in many cases, for example connected downstream of internal combustion engines, to remove undesirable exhaust gas constituents from the exhaust gas of the internal combustion engines.

A key molecule in the reduction of the level of unwanted exhaust gas constituents here is $NO_2$.

For minimization of carbon-containing fine particulates, what are called particulate separators or particulate filters are typically used in motor vehicles. A typical particulate separator arrangement in vehicles is known, for example, from EP 1 072 765 A2. Such particulate separators differ from the particulate filters in that the exhaust gas stream is conducted along the separation structures, whereas the exhaust gas must flow through the filter medium in particulate filters. As a result of this difference, particulate filters have a tendency to blockage, which increases an exhaust gas backpressure, i.e., causes an unwanted pressure increase at the exhaust gas outlet of an internal combustion engine, which in turn reduces the engine power and results in increased fuel consumption of the internal combustion engine. One example of such a particulate filter arrangement is known from EP 0 341 832 A2.

In both above-described arrangements, an oxidation catalyst arranged upstream of the particulate separator or particulate filter in each case oxidizes the nitrogen monoxide (NO) in the exhaust gas with the aid of residual oxygen (O2) likewise present to give nitrogen dioxide ($NO_2$) according to the following equation:

   (1)

In this context, it should be noted that the equilibrium of the above reaction is to the side of NO at high temperatures. This in turn has the consequence that the achievable $NO_2$ contents at high temperatures are limited because of this thermodynamic restriction.

The $NO_2$ in turn reacts in the particulate filter with the carbon-containing ultrafine particulates to give CO, $CO_2$, $N_2$ and NO. With the aid of the strong oxidizing agent $NO_2$, therein thus continuous removal of the fine particulates accumulated, and so it is possible to dispense with regeneration cycles such as those which have to be performed in a costly and inconvenient manner in other arrangements. In this context, reference is made to passive regeneration, according to the following equations:

   (2)

   (3)

The formation of carbon monoxide according to equation (3) plays only a minor role; usually, complete oxidation of the carbon takes place up to the +4 oxidation state, in the form of carbon dioxide, this oxidation requiring two $NO_2$ molecules per carbon molecule.

As well as $NO_2$, $SO_3$ is also formed over platinum-containing NO oxidation catalysts from sulphur present in the fuel and/or motor oil. The $SO_3$ and $NO_2$ condense at cold points in the exhaust tract to give highly corrosive sulphuric acid and nitric acid respectively, and so the exhaust system has to be constructed in stainless steel up to the particulate filters in order to avoid corrosion. A further problem with the oxidation of $SO_2$ is a deactivation of the NO oxidation catalyst by sulphates, and in the worst case by the physisorption of sulphuric acid at the catalyst surface.

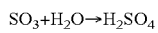

The deactivation of the catalyst can be reversed in the typically $Al_2O_3$-based catalysts according to the prior art by raising the exhaust gas temperature to more than 500° C., but these high exhaust gas temperatures barely ever occur in modern, use-optimized internal combustion engines.

If the carbon deposited in the particulate filter is not fully oxidized with the aid of $NO_2$, the carbon content and hence the exhaust gas backpressure rise constantly. In order to avoid this, the particulate filters are currently increasingly being provided with a catalytic coating for oxidation of NO (EP 0 341 832 A2). This involves catalysts with a platinum-containing coating. The disadvantage of this known process, however, is that the $NO_2$ formed over the particulate filter can serve only to oxidize particles which have been deposited downstream of the catalytically active layer for NO oxidation, thus meaning within the filter medium. If, in contrast, a layer of deposited particles, called a filtercake, forms on the filter surface and hence on the catalytically active layer, the NO oxidation catalyst on the particulate filter side is downstream of the filtercake, and so the soot particles deposited there cannot be oxidized with the aid of $NO_2$ from the NO oxidation catalyst applied to the particulate filter. In addition, strictly speaking, only the catalyst layer applied to the dirty gas side contributes to the performance of the system, since the $NO_2$ formed catalytically on the clean gas side cannot come into contact again with the soot deposited on the dirty gas side and within the filter material.

A further problem with the coating of the particulate filter is that the geometric surface areas of the filter are much lower than those of the catalytic converter substrates typically used. The reason for this is that the filters require relatively large free cross sections and hence free volume on the dirty gas side for incorporation of soot and motor oil ash. If ceramic filter substrates are used, this is achieved by a low cell density of 50 cells per square inch (cpsi) to 200 cpsi. Compared to this, pure catalytic converters typically have cell densities of 400 cpsi to 900 cpsi. The rise from 50 cpsi to 900 cpsi results in an increase in the geometric surface area from 1 $m^2/l$ to 4 $m^2/l$, which enables considerable increases in conversion in the catalytic converters.

For these reasons, in spite of the catalytic coating of the filter, it is not possible to dispense with an NO oxidation catalyst upstream of the particulate filter, resulting in a relatively large installation volume. This is the case even when the NO oxidation catalysts and the particulate filters form one installed unit in which the inlet region of the particulate filter takes the form of an NO oxidation catalyst, as described, for example, in DE 103 270 30 A1.

In all these variants for passive regeneration by means of $NO_2$, it should be noted that the soot oxidation cannot be enhanced further below 200° C. to 230° C. even by a rise in the amounts of $NO_2$. At about 370° C., the conversion maximum is attained. From this temperature, the soot oxidation proceeds according to the above-described reaction (2), meaning that two $NO_2$ molecules react with one carbon molecule. In terms of mass, this means that 0.13 g of carbon can be oxidized with one gram of $NO_2$; in other words, soot oxidation can be increased as desired by raising the amount of $NO_2$.

If the temperatures are below 200° C. to 230° C., reliable function of the particulate filter thus cannot be ensured. This typically occurs in the case of engines having to stress levels and installed in motor vehicles, for example in passenger vehicles, urban buses or refuse vehicles, which have additional high proportions of idling time. Therefore, specifically in such cases, a second means of particulate filter regeneration is employed, in which exhaust gas temperature is actively raised. This is typically done by the addition of hydrocarbons (HC) upstream of catalysts, especially upstream of HC oxidation catalysts. Because of the exothermicity of the oxidation of the hydrocarbons added with the aid of the catalysts, a distinct temperature rise is achieved:

$$\text{"HC"} + O_2 \rightarrow CO + H_2O \qquad (4)$$

$$\text{"HC"} + O_2 \rightarrow CO_2 + HO \qquad (5)$$

In order to sufficiently thermally stabilize these catalysts, they usually contain palladium as an active component. Although palladium knows a very good HC oxidation activity on, it does not have any NO oxidation activity and additionally reduces the NO oxidation activity of any platinum present in the catalysts. As a result of this, HC oxidation catalysts have a much lower NO oxidation activity than pure NO oxidation catalysts.

If the metered addition of hydrocarbons achieves a temperature rise to more than 600° C., the carbon deposited in the particulate filter is oxidized or burnt off with the aid of oxygen, according to the following equations:

$$C + O_2 \rightarrow CO_2 \qquad (5)$$

$$2C + O_2 \rightarrow 2CO \qquad (7)$$

However, in the case of this so-called active filter regeneration, there is the risk that the exothermic burnoff of the carbon-containing soot can result in a significant temperature rise to up to 1000° C. and hence in damage to the particulate filter, and/or downstream catalysts. Since the temperature increase additionally has to be maintained for several minutes in order to ensure quantitative oxidation of the soot particles, the demand for hydrocarbons is not inconsiderable and reduces the efficiency of the internal combustion engine, since the fuel is typically used as the hydrocarbon source.

A further problem, in contrast to passive regeneration, is the high carbon monoxide emissions during the regeneration, the formation of which is described in equation (7). For this reason a further catalyst for oxidation of the carbon monoxide formed during the regeneration has to be positioned on the particulate filter and/or downstream of the particulate filter in order to avoid the emission thereof into the environment.

A simple combination of passive and active regeneration by adding hydrocarbons upstream of NO oxidation catalysts is not productive:

As a result of the temperature rise to more than 600° C., barely any further $NO_2$ is formed over the NO oxidation catalysts because of the thermodynamic restriction. In addition, the oxidation of NO is hindered by the large amounts of hydrocarbons, as a result of which there is a significant reduction in $NO_2$ formation. The effect of this is that the particles have to be oxidized with the aid of oxygen alone, since no $NO_2$ is available in this phase, which prolongs the regeneration time and leads to high carbon monoxide emissions.

At the area time, the NO oxidation catalysts are much less stable to thermal damage than catalysts for hydrocarbon oxidation, since there irreversible sintering of the active components and hence a decline in the NO oxidation activity at temperatures exceeding 550° C.

As well as the oxidation of carbon-containing particulates in particulate filters, $NO_2$ is also used to accelerate the SCR reaction (selective catalytic reduction reaction), or in the case of $NO_x$ storage catalysts for formation of nitrates.

As already indicated above, a problem with the NO oxidation catalysts is that they are deactivated in the presence of sulphur oxide which is formed by the combustion of sulphur from fuel or lubricant oil. One means of alleviating this problem is to use titanium dioxide rather than $Al_2O_3$, which is typically used as the catalyst support material: sulphur trioxide or sulphuric acid is adsorbed to a much lesser degree thereon; at the same time, desorption is possible at much lower temperatures. However, in the case of use of $TiO_2$, the problem arises that conversion from the anatase form to the rutile form takes place at relatively high temperatures, which results in a decline in the BET surface area (to DIN ISO 9277: 2003-05) and an accompanying decline in activity.

A further disadvantage of processes currently used is that such known catalysts are produced by wet-chemical means, the result of which is chat the actual active platinum component is often surrounded by $Al_2O_3$ support material and is thus inaccessible to the actual reaction.

SUMMARY OF THE INVENTION

It is an object of the invention to avoid the above disadvantages and provide a catalyst for oxidation of exhaust gas constituents, especially nitrogen monoxide, which is improved in terms of sulphur resistance and with regard to thermal stability over catalysts known to date, and a process for producing such a catalyst, the use of such a catalyst, and a coating produced with such a catalyst.

the object is achieved by a catalyst especially for oxidation of exhaust gas constituents, for example nitrogen oxide, preferably nitrogen monoxide, wherein the catalyst consists of a particulate support material composed of titanium-containing nanoparticles and/or preferably titanium oxide nanoparticles, especially titanium dioxide nanoparticles, coated with platinum, especially platinum particles.

An essential aspect of the invention is that catalyst consists of particulate support material composed of titanium-containing nanoparticles, the titanium-containing nanoparticles being coated with platinum, especially platinum particles.

The inventive catalyst thus has two crucial advantages over catalysts known from the prior art, these being that the support material of the catalyst consists of nanoparticles having a very large surface area coated with platinum particles, preferably platinum nanoparticles, which constitute the catalytically active oxidation component of the inventive catalyst.

According to the invention, the support material of the inventive catalyst is thus titanium-based, the support material preferably consisting of titanium oxide nanoparticles and more preferably of titanium dioxide nanoparticles, which constitute the support for the catalytically active platinum-containing material. According to the invention, the platinum-containing material is metallic platinum arranged on the surface of the support material particles. The platinum particles here are bonded to the support particles over a contact region which may take the form of dots up to areas, while the rest of the surface of the platinum particles, in an extremely advantageous manner in accordance with the invention, is catalytically available and is essentially not covered by catalytically inactive titanium-containing materials. In this way, the inventive catalyst firstly provides a maximum catalytically active surface area, over which nitrogen oxides, especially nitrogen monoxide, can be oxidized, and, furthermore, a very large support material surface area on which these platinum-containing catalyst components are present is also provided on the individual support material particles in addition to the maximum platinum surface area, since the support material consists of very small nanoparticles in the order of magnitude of a few nanometers with a correspondingly large surface area.

The titanium-containing nanoparticles are produced here according to the prior art by the introduction of a titanium-containing precursor material into a flame or a pyrolysis oven, as described, for example, in DE 101 09 892 B4 or EP 0 773 312 B1.

Thus, the inventive catalyst has, as well as a very large catalytically active surface area, a further significant advantage, which is that the catalyst, because of its titanium-containing support material, is substantially inert with respect to sulphur poisoning, i.e. deactivation by sulphur-containing substances, and retains its catalytic activity even in the case of combustion of fuels contaminated with sulphur compounds.

In an advantageous embodiment of the invention, a multitude of support material particles are joined to one another via bridges which especially contain metal oxide and preferably contain silicon and/or tungsten and are arranged between these particles. These bridges between the individual support material particles, especially titanium dioxide crystals, as has been found in accordance with the invention, stabilize these titanium dioxide crystals in the anatase form thereof, and a conversion to the rutile form of titanium dioxide, which typically takes place above 550° C., is checked or completely suppressed, such that the titanium dioxide crystals bonded to one another by silicon- and/or tungsten-containing bridges in accordance with the invention are essentially stable in the anatase form up to about 800° C. This means a further significant advantage of the invention, since the anatase form of titanium dioxide provides a significantly greater surface area than the rutile form thereof, and so the catalyst surface area of the inventive catalyst arises not just from the very large external surface area of the nanoparticles which form the support material, but also from the crystal structure of this titanium dioxide nanoparticles.

In addition, in accordance with the invention, it is envisaged in a further preferred embodiment that between a multitude of platinum particles with which the particulate support material is coated are joined to one another via bridges which contain especially metal oxide and preferably silicon and/or tungsten and are arranged between these platinum particles. These bridges formed between the platinum particles stabilize the platinum and reduce or most favorably entirely prevent the sintering thereof, especially at high temperatures.

It is pointed out her that the bridges arranged between the platinum and/or support material particles may be present either only between the support material particles or else both between the support material particles and between the platinum particles, and additionally, in some cases, between platinum and support material particles.

It has advantageously been found in accordance with the invention that bridging of the platinum particles leads to a slight reduction in the catalytically active surface area of the platinum particles as a result of the respective attachment points of the respective bridges, but the avoidance of sintering of the platinum at high temperatures makes any such loss of activity of the inventive catalyst very low. Thus, the inventive catalyst is also stabilized over the course of its use and has a very high catalytically active surface area stable over a long period for oxidation of exhaust gas constituents, especially nitrogen monoxide.

Incidentally, it has been found in accordance with the invention that a further thermal stabilization of platinum is also possible through an addition of a palladium-containing compound, and the inventive catalyst may thus optionally, according to the field of use, include palladium.

According to the invention, the platinum concentration of the catalyst is in the range from 0.5 mg to 150 mg, preferably in the range from 1 mg to 100 mg, per gram of catalyst weight. According to the invention, it is thus possible to provide a catalyst having an activity optimized for a respective area or use with simultaneously low platinum consumption, and in this way to make the costs for the provision of the inventive catalyst extremely economical. A platinum concentration particularly preferred in accordance with the invention here is in the range from 1 mg to 80 mg per gram of catalyst weight. The term "catalyst weight" here is understood to mean the total weight of support material, platinum material and bridge material. The material of the bridges arranged between the platinum Particles and/or support material particles, as mentioned above, preferably contains silicon, namely silicon oxide and/or tungsten, preference also being given here to tungsten oxide. One advantage of silicon-containing bridges between the platinum particles and/or support material particles is that silicon is inert with respect to the oxidation activity of platinum and hence with respect to the oxidation reaction of nitrogen monoxide to nitrogen dioxide. The use of tungsten-containing material for formation of bridges between the platinum particles and/or support material particles is envisaged in accordance with the invention when not only an oxidation reaction of nitrogen oxide but also an SCR reaction is desired, since tungsten oxide is catalytically active with respect to the SCR reaction, and in this way contributes, especially in combination with the catalytically generated nitrogen dioxide, to the removal of nitrogen monoxide.

In addition, the inventive catalyst has a titanium:silicon ratio of 20:1 to 2:1 and/or a titanium:tungsten ratio of 80:1 to 8:1. Advantageously, the inventive catalyst can also be matched to the respective field of use thereof in this way, whether in a firing plant, a refuse incineration plant, a gas turbine, another industrial plant in which incineration is performed, or in an internal combustion engine. For example, the silicon content in the inventive catalyst can be reduced when the exhaust gases flowing through and/or around the catalyst are relatively cold, such that conversion from the anatase form of titanium dioxide to the rutile form thereof, which would take place above 550° C. without silicon oxide stabilization of the titanium dioxide support material, essentially does not take place because of a relatively low exhaust gas temperature. According to the invention, it is thus possible, through an increase in the silicon content in the inventive catalyst, to undertake matching of the catalyst to the exhaust gas temperature which occurs in each case, or to produce the catalyst correspondingly.

In addition, the object of the invention is especially also achieved by a process for producing a catalyst, especially for oxidation of exhaust gas constituents, for example nitrogen oxide, preferably nitrogen monoxide, wherein the following steps are performed:

providing titanium-containing first precursor material for production of support material;

providing platinum-containing second precursor material for production of a catalytically active, especially oxidatively effective, component;

providing third precursor material, especially containing silicon and/or tungsten and/or palladium, for production of stabilizing material, especially stabilizing bridges;

introducing the titanium-containing first precursor material into a through-flowable reaction zone of a pyrolysis device, for example a flame or a pyrolysis oven;

introducing the platinum-containing second precursor material into the reaction zone downstream of an addition of the titanium-containing first precursor material; and introducing the third precursor material into the reaction zone simultaneously with the introduction of the titanium-containing first precursor material and/or downstream of the addition of the titanium-containing it precursor material and/or downstream of the addition of the platinum-containing second precursor material.

An essential aspect in this process according to the invention is that the first, second and third precursor materials are converted in a particular sequence in a reaction zone of a pyrolysis device, for example a flame or a pyrolysis oven, to the catalyst constituents, namely firstly to the support material, secondly to the oxidatively active catalyst material, and also to the stabilization material which joins the platinum particles and/or support material particles to one another via bridges.

For this purpose, the respective precursor materials are introduced into a reaction zone in the pyrolysis device through which flow can take place in a preferential flow direction, the terms "downstream" and "upstream" referring hereinafter to the aforementioned preferential flow direction employed in operation.

According to the invention, it is possible by means of the process accord lop to the invention to provide a novel oxidation catalyst which has stability properties adapted according to the field of use with a simultaneously optimized catalyst activity. For instance, it is possible in accordance with the invention to introduce the third precursor material which serves for production of stabilization material, namely more particularly for formation of stabilization bridges, into the reaction zone of the pyrolysis device simultaneously with the titanium-containing first precursor material. In this case, titanium oxide compounds, namely preferably titanium dioxide nanoparticles, which serve as support material for the novel catalyst, are firstly formed from the titanium-containing first precursor material, while oxidic bridges form between the titanium dioxide particles from the third precursor material which especially contains silicon and/or tungsten.

In a second inventive process variant, it is possible to add the third precursor material to the reaction zone downstream of the addition of the titanium-containing first precursor material. Such a procedure is preferable, since it is possible in this way first to convert the titanium-containing first precursor material within the reaction zone of the pyrolysis device to titanium oxide, especially titanium dioxide, and the third, bridge-forming precursor material is added to the reaction zone in a second step, i.e. downstream of the addition of the first titanium-containing precursor material. In this way, it is possible in accordance with the invention to substantially avoid mixing of the first and third precursor materials, such that the third precursor material serves only for formation of bridge material between the titanium oxide nanoparticles and there is essentially no mixing of silicon oxide and titanium oxide.

Both in the case of the first variant, namely simultaneous introduction of first and third precursor materials into the reaction in the pyrolysis device, and in the case of the second variant, in which the third precursor material is effected downstream of an addition point the titanium-containing first precursor material, the platinum-containing second precursor material is introduced into the reaction zone of the pyrolysis device in a further step downstream, where the platinum compound introduced is then converted to preferably metallic platinum.

In the two aforementioned process variants, the introduction of the platinum-containing second precursor material into the reaction zone at a time at which both the first titanium-containing and the third bridge-forming precursor materials have already been introduced into the reaction zone of the pyrolysis device ensures that the platinum particles are deposited on the surface of the support material particles without coverage of an active surface of the platinum particles by support material- or bridge-forming material. Thus, the addition of the platinum-containing second precursor material downstream of an addition of the first and third precursor materials to the reaction zone prevents restricted activity of the catalyst, since the maximum available surface area of the platinum component of the catalyst is available for oxidation catalysis.

The formation of metal oxide bridges between the individual titanium dioxide particles or crystals enables stabilization of the anatase form of the titanium dioxide crystals to such an extent that conversion to the rutile structure of the titanium dioxide crystals does not take place above 550° C., but only at a temperature greater than 800° C. Thus, the formation of oxidic bridges, and not titanium oxide bridges, between the titanium dioxide particles can provide a maximum surface area based on the anatase structure of the titanium dioxide, crystals.

In a third variant of the process according to the invention, it is additionally possible to introduce the platinum-containing second precursor material into the reaction zone of the pyrolysis device downstream of an addition point of the titanium-containing first precursor material without having introduced a bridge-forming third precursor material into this reaction zone beforehand. In this case, the titanium-containing first precursor material at first forms titanium dioxide, which is obtained in the form of titanium oxide crystals, on which platinum particles which form from the second precursor material in the reaction zone of the pyrolysis device are then deposited. In this way, it is possible in accordance with the invention to provide an oxidation catalyst for the oxidation of exhaust gas constituents, for example nitrogen oxide, preferably nitrogen monoxide, this having, because of the support material present in the form of nanoparticles, a very large support material surface area on which nanoparticulate metallic platinum is in turn disposed, and this in turn is connected to the latter only by respective contact sites between platinum metal and titanium dioxide crystal and in this way provides a maximum active catalyst surface area.

In addition, it is likewise envisaged in accordance with the invention that the support material particles covered with platinum metal are exposed in a further step to a third precursor material which is introduced into the reaction zone of the pyrolysing device downstream of the addition of the platinum-containing second precursor material and is converted therein, and forms bridges both between the titanium dioxide nanocrystals on the one hand and between the platinum particles on the other hand, with the advantage that the titanium dioxide crystals are firstly stabilized in the anatase form by the oxidic bridges formed from the third precursor material, while the platinum is secondly and additionally also prevented from sintering by the metal oxide-containing bridges between the platinum particles, such that the large surface area of the platinum particles, especially platinum nanoparticles, is preserved. To what extent stabilization of the titanium dioxide crystals and/or of the platinum disposed on the support particles is necessary or desirable depends here, as mentioned above, on the respective field of use, and the degree of the respective bridge formation, or the amount of the third precursor material added, enables fine adjustment to the particular desired requirements of the inventive novel oxidation catalyst.

The precursor materials which, with particular preference in accordance with the invention, are used individually or in combination can be taken from the following table:

| First precursor material | Titanium compounds, especially titanium halides, for example $TiCl_4$, $Ti(NO_3)_2$, $Ti(SO_4)_2$, titanium acetates, titanium tetraisopropoxide, titanium alkoxides, especially titanium tetraethoxide |
|---|---|
| Second precursor material | Platinum compounds, especially platinum chlorides, platinum acetates, tetraammineplatinum hydroxide, platinum alkoxides, platinum nitrate; palladium compounds, especially palladium chlorides |
| Third precursor material | Silicon compounds, especially silicon halides, especially silicon chlorides, for example $SiCl_4$, silanes, especially hexamethyldisiloxane, silicon alkoxides; tungsten compounds, especially tungsten halides, for example $WCl_3$, $WBr_3$, tungstates, for example $(NH_4)_{10}W_{12}O_{41}$, tungsten alkoxides, tungsten acetates, tungsten nitrate, palladium compounds, especially palladium chlorides |

It should also be pointed out here that the third precursor material used may also be palladium compounds, especially palladium chlorides, preferably in combination with silicon and/or tungsten compounds. The silicon and/or tungsten compounds serve here in accordance with the invention as bridge-forming precursor materials, while the palladium compound serves to provide the NO oxidation catalyst with a high HC oxidation activity without any decline in the NO oxidation activity resulting from coverage with palladium.

If, however, the aim is to thermally stabilize the platinum and to counteract sintering of the platinum crystals, palladium and platinum are added together as the second precursor material, as a result of which they form platinum-palladium compounds. However, this process results in a decline in the NO oxidation activity because of the platinum surfaces covered by the palladium, but this in turn has a positive effect on the HC oxidation capacity of the catalyst.

In the reaction zone of the pyrolysis device, the first precursor material consisting essentially of titanium compounds is converted, such that the titanium compounds used form titanium oxides, preferably titanium dioxide.

The same applies to the precursor material, used in accordance with the invention in the case of silicon and/or tungsten compounds, which in turn are also converted or oxidized to the respective oxides, especially silicon dioxide and tungsten trioxide.

For this reason, the first and/or third precursor material, provided that it is not a palladium compound, is introduced into the reaction zone of the pyrolysis device in or essentially together with an oxidizing atmosphere. The oxidizing atmosphere is obtained here by addition of especially gaseous oxidizing agent, for example oxygen, air or carbon monoxide, into the reaction zone. This means that an appropriate oxidizing agent, especially in excess, is likewise added to the reaction zone immediately before, simultaneously with or immediately after an addition of the first and/or third precursor material to the reaction zone, namely the particular addition point of the first and/or third precursor material, such that the first and/or third precursor material in the reaction one is effectively surrounded by the oxidizing agent and comes into direct contact with the oxidizing agent, such that the corresponding oxides of the precursor materials can form.

In addition, it is envisaged in accordance with the invention that the second precursor material is introduced into the reaction zone in or essentially together with a reducing atmosphere, such a reducing atmosphere being obtained, for example, by addition of especially gaseous reducing agent, for example hydrogen, to the reaction zone. Here too, the reducing agent can be introduced into the reaction zone immediately before, simultaneously with or immediately after the addition of the second precursor material at the addition site thereof, and so it is also ensured here that the second precursor material comes into close contact, enabling a reduction reaction, with the reducing agent, and is effectively surrounded or enveloped thereby.

It should be pointed out here that the palladium compound can also be introduced into the reaction zone in or essentially together with a reducing atmosphere, such that the palladium compound, and likewise the platinum compound used as the second precursor material, form the respective metal in the reaction zone of the pyrolysis device.

In addition, the object of the invention is achieved by the use of a catalyst according to the above details for oxidation of exhaust gas constituents, for example nitrogen oxide, preferably nitrogen monoxide, especially downstream of an internal combustion engine, for example an engine, especially a motor vehicle engine.

Furthermore, the object of the invention is also achieved by a coating, especially of an exhaust gas system, especially applied to ceramic or metallic catalyst substrates, which has been produced using a catalyst according to the above remarks.

In summary, the essential aspects of the invention can thus be summarized as follows:

According to the invention, at least three metal compounds are thus brought into solution and injected into a flame or a pyrolysis oven. One metal compound contains titanium and one further metal compound platinum. The third metal compound serves to stabilize the nanocrystals which form in the pyrolysis device, especially flame. This can be effected, for example, through the use of silicon compounds or tungsten compounds.

Thus, the three metal compounds have the following tasks:
1. Titanium provides surface and support material
2. Platinum: provides oxidation component
3. Third metal compound: stabilizes platinum, titanium dioxide or both The production of nanocrystals, especially of titanium-containing nanoparticles, is prior art and is possible, as already described above, through the injection of a titanium-containing solution into a flame or a pyrolysis oven, as described, for example, in DE69509396T2 or DE10109892B4.

The process according to the invention differs from the prior art cited in that the platinum compound is injected into the flame or the pyrolysis oven downstream of the feed for the titanium compound.

The advantage of this procedure is that the platinum is deposited on the surface the titanium oxide crystals. As a result, in contrast to otherwise customary wet-chemical washcoat syntheses, it is not covered by inactive titanium dioxide and thus remains freely accessible to the NO molecules in the course of later use.

In addition, the above-described catalyst base material composed of titanium, dioxide and platinum is stabilized with the aid of a further metal oxide which is likewise added to the flame or the pyrolysis oven. Advantageously, this is a tungsten compound and/or silicon compound.

There are several means of stabilization:

Through the simultaneous addition of the titanium-containing and stabilizing silicon- or tungsten-containing metal compounds to the flame, the titanium dioxide is stabilized through the formation of metal oxide bridges, and not titanium oxide-containing bridge, between the individual titanium dioxide crystals in the anatase form. It is thus also possible to stabilize the titanium dioxide above 550° C., at which a conversion to rutile would typically take place, thermally up to about 800° C. The bridge formation can additionally be improved when the stabilizing metal compound is added to the flame or pyrolysis oven downstream of the addition of the titanium compound, since the titanium dioxide nanocrystals have already formed here, and stabilizing metal compound can be deposited very specifically on these surfaces.

If this stabilizing metal compound, moreover, is added downstream of the addition of the platinum compound, stabilizing metal oxide-containing bridges which additionally stabilize the platinum and prevent the sintering thereof are additionally formed between the platinum-containing and titanium-containing crystals. The hypothetical disadvantage is, however, that there can be coverage of the platinum crystals by the stabilizing metal oxide-containing compound in some regions, which theoretically somewhat lowers the activity of the catalyst; however, this is partly compensated for by the avoidance of sintering of the platinum. In order to avoid this, the stabilizing metal compound can also be effected between the addition of the titanium-containing and platinum-containing solutions.

The precursors used for the titanium compound may be $TiCl_4$, $Ti(NO_3)_2$, titanium alkoxides, titanium acetates, titanium tetraisopropoxide or $Ti(SO_4)_2$. The precursors used for the stabilizing compound may be $SiCl_4$ or silanes, especially hexamethyldisiloxane, and also $WBr_3$, $WCl_3$, tungsten acetates, tungsten alkoxides, tungsten nitrate or tungstates such as $(NH_4)_{10}W_{12}O_{41}$.

The precursors used for the platinum compound may be platinum chlorides, platinum acetate, tetraammineplatinum hydroxide, platinum alkozide or platinum nitrate.

In order to thermally stabilize platinum even further, addition of palladium compounds is also possible.

In order to ensure oxidation of the metal-containing precursor to metal oxides, it is advisable additionally to introduce an oxidizing agent, such as oxygen, air or carbon monoxide, into the reaction zone. It is likewise possible to optimize reduction of the platinum and palladium compounds by addition of reducing agent, for example hydrogen.

Further embodiments of the invention are evident from the dependent claims.

BRIEF DESCRIPTION OF THE DRAWINGS

The invention is described hereinafter with reference to working examples, which are illustrated in detail by the drawings mentioned. These show:

FIG. 3 an illustrative schematic diagram of the reaction regime for production of the inventive catalyst according to the embodiment shown in FIG. 2; and FIG. 4 an illustrative schematic diagram of a structure for production of the inventive catalyst.

DETAILED DESCRIPTION OF THE PREFERRED EMBODIMENTS

Figure 1:
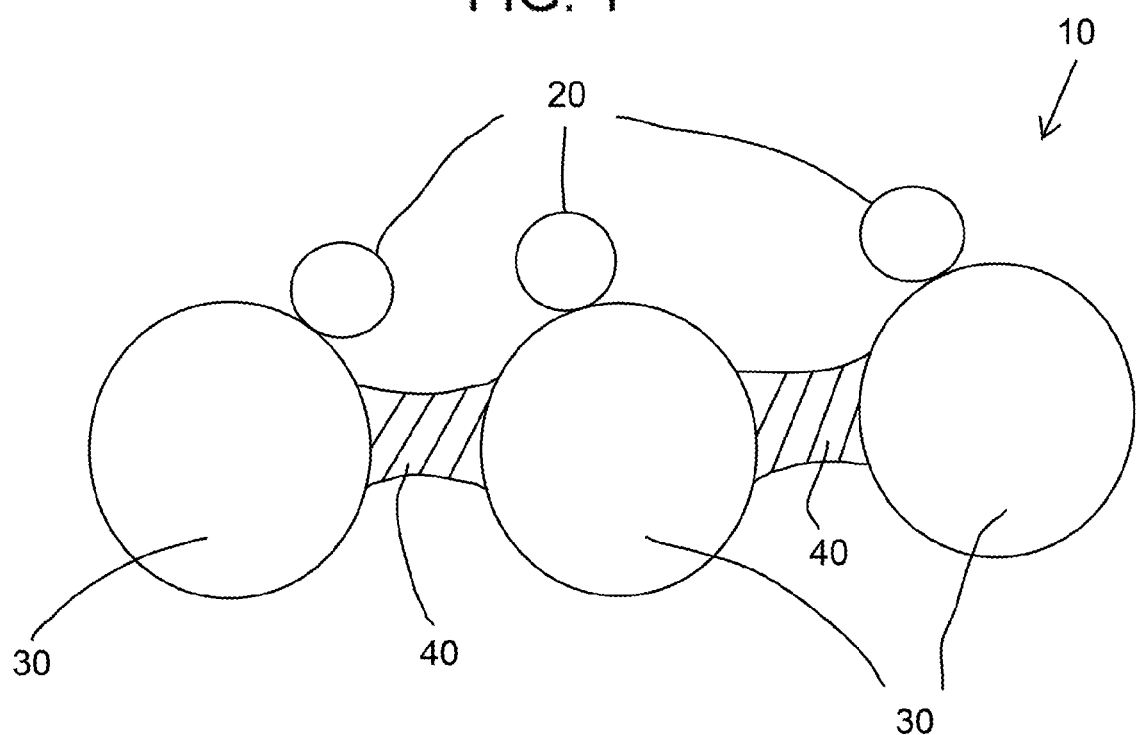
FIG. 1 a schematic diagram of an inventive catalyst, according to a first embodiment.

The description which follows uses the same reference numerals for identical or equivalent parts.

FIG. 1 shows a schematic diagram of an inventive catalyst according to a first embodiment of the invention, wherein titanium dioxide particles in anatase form serve as support material (30). The support material particles (30) composed of titanium dioxide nanoparticles in anatase form are joined to one another by silicon-containing, namely silicon dioxide-containing, bridges (40) and are stabilized in the anatase form in this way. On the surface of the remaining, i.e. unbridged, surface of the support material particles (30) are disposed platinum crystals (20) in the form of platinum particles. This first embodiment of the invention is obtained when the platinum-containing precursor is added to the flame or the pyrolysis oven, or to the respective reaction zone, downstream of the stabilizing precursor (precursor 3) and titanium-containing precursor (precursor 1).

Figure 2:
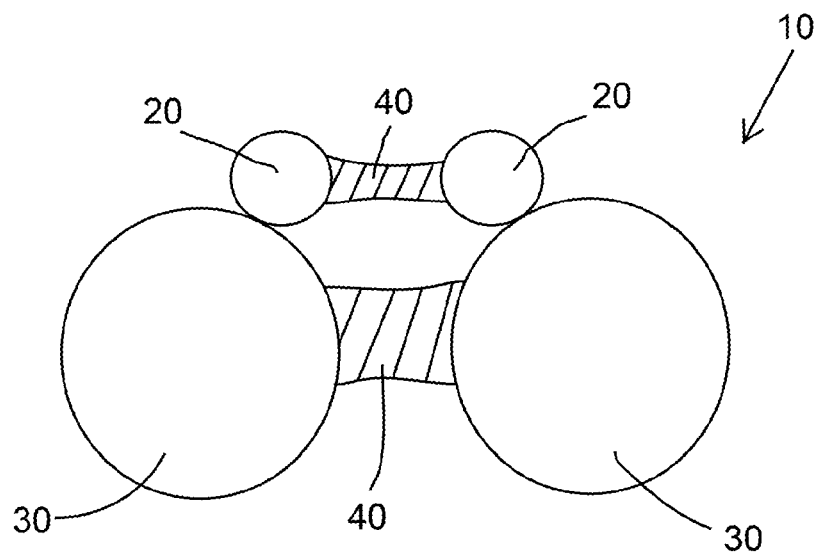
FIG. 2 a schematic diagram of an inventive catalyst, according to a second embodiment.

FIG. 2 shows, in contrast, in schematic view, a second embodiment of the invention, in which not just the support material, titanium dioxide (30) composed of nanocrystals in the anatase structure, but also the platinum particles (20) disposed on these support material particles (30) are joined by bridges of silicon oxide. This embodiment of the inventive catalyst is obtained when the stabilizing silicon-containing compound is added to the reaction zone of the pyrolysis device, i.e. to the flame or the pyrolysis oven, downstream of the titanium-containing and platinum-containing precursors.

FIG. 3 shows such a procedure in schematic view. This involves first injecting the first precursor material (31), which contains titanium, into the flame of a pyrolysis device, then injecting the platinum-containing second precursor material (21) into the flame downstream of the addition point for the first titanium-containing precursor material (31). After both the titanium-containing first precursor material (31) and the platinum-containing second precursor material (21) have been injected into the flame, the third, bridge-forming precursor material (41) is then in turn added to the flame downstream of the first two addition points. In this working example, the titanium-containing first precursor material (31) is added in an oxygen excess zone, such that the titanium-containing precursor compound is converted in the pyrolysis flame to titanium dioxide. At the addition point of the titanium-containing precursor material (31), hydrogen is metered into the flame of the pyrolysis device (not shown) simultaneously with the second precursor material (21), while there is in turn an oxygen excess which is established by addition of air (not shown) in the region of the addition point for the third precursor material (41).

FIG. 4 shows a schematic of the production of an inventive catalyst according to FIG. 1. This involves passing oxygen through a wash bottle which contains titanium tetraisopropoxide (TTIP, 98%) 31 and is heated to 98° C. with the aid of an oil bath; the flow rate is 7.5 l/min. Through a line heated to 220° C., the titanium tetraisopropoxide-containing carrier stream is passed into the centre of the burner 44. Adjacent to this feed, methane and oxygen are introduced as the fuel gas. In flow direction, first aqueous $SiCl_4$ solution 41 via an $O_2$ gas stream (7.5 l/min) and then an aqueous $PtCl_4$ solution 21, via a hydrogen carrier stream are fed into the flame which forms. The hydrogen carrier stream ensures a reducing atmosphere in the reaction zone, such that platinum crystals and not platinum oxide crystals having much lower NO oxidation activity are formed. This is followed by a quenching zone 46 in which the reaction temperature is lowered abruptly with the aid of an air feed and hence particle coagulation is avoided. The gas flowing out of the reactor is finally passed through a filter 45, with the aid of which the catalyst obtained is separated from the gas stream.

The table which follows shows the $NO_2/NO_x$ ratios obtained catalytically by the process shown in FIG. 4 and conducted with the aid of a model gas apparatus for an inventive catalyst compared to an $Al_2O_3$-based catalyst corresponding to the existing prior art. For both catalysts, the platinum loading was 9 mg/g, the space velocity 40 000 l/h and the NO concentration upstream of the catalysts 1000 ppm. For the inventive catalyst, the titanium to silicon ratio was 15:1. The results show a much higher $NO_2$ content in the overall nitrogen oxides downstream of the inventive catalyst, and hence the potential for a reduction in the amount of platinum and in the catalyst volume needed coupled with better catalyst performance.

| Temperature [° C.] | NO2/NOx [ ] Inventive catalyst BET: 123 m²/g Pt dispersion*: 0.32 | NO2/NOx [ ] Catalyst according to the prior art: BET: 48 m²/g Pt dispersion*: 0.19 |
|---|---|---|
| 150 | 0.11 | 0.01 |
| 200 | 0.68 | 0.11 |
| 250 | 0.89 | 0.41 |
| 300 | 0.88 | 0.68 |
| 350 | 0.75 | 0.65 |
| 400 | 0.55 | 0.53 |

*Pt dispersion measured via CO chemisorption (see J. Anderson et al., Supports metals in catalysts, Imperial College Press London 2005)

It should be pointed out here that all parts described above, taken alone and in any combination, especially the details shown in the drawings, are claimed as essential to the invention. Modifications therefrom are familiar to those skilled in the art.

LIST OF REFERENCE NUMERALS

10 Catalyst
20 Platinum particle
21 Second precursor material
30 Support material
31 First precursor material
40 Bridge
41 Third precursor material
45 Filter
46 Quenching zone
50 Reaction zone

What is claimed is:

1. A catalyst for oxidation of exhaust gas constituents including nitrogen oxide, the catalyst comprising:
   a particulate support material composed of titanium-containing nanoparticles;
   a platinum coating, wherein the support material is coated with the platinum coating; and
   bridges arranged between and joining at least one of a plurality of platinum particles of the platinum coating and a plurality of support material particles of the support material, the bridges containing metal oxide and at least one of silicon and tungsten.

2. The catalyst according to claim 1, wherein the catalyst oxidizes nitrogen monoxide, the particulate support material is composed of titanium dioxide nanoparticles, and the platinum coating is composed of platinum particles.

3. The catalyst according to claim 1, wherein the platinum coating is composed of platinum nanoparticles.

4. The catalyst according to claim 1, wherein the catalyst further includes palladium.

5. The catalyst according to claim 1, wherein the catalyst has a platinum concentration in the range of 0.5 mg to 150 mg per 1 gram of catalyst weight.

6. The catalyst according to claim 1, wherein the catalyst has a platinum concentration in the range of 1 mg to 100 mg per 1 gram of catalyst weight.

7. The catalyst according to claim 1, wherein the catalyst has one of:
   a titanium:silicon ratio of 20:1 to 2:1; and
   a titanium:tungsten ratio of 80:1 to 8:1.

8. A process for producing a catalyst according to claim 1, comprising the following steps:
   providing a titanium-containing first precursor material for production of a support material;
   providing a second precursor material for production of a catalytically active component, the second precursor material comprising at least one of platinum and palladium;
   providing a third precursor material containing at least one of silicon, tungsten, and palladium, for production of a stabilizing material;
   introducing the titanium-containing first precursor material into a through-flowable reaction zone of a pyrolysis device;
   introducing the second precursor material into the reaction zone downstream of where the first precursor material is introduced; and
   introducing the third precursor material into the reaction zone one of:
      simultaneously with the introduction of the first precursor material;
      downstream of where the first precursor material is introduced;
      downstream of where the second precursor material is introduced.

9. The process according to claim 8, wherein:
   the first precursor material comprises one of titanium halides, titanium acetates, titanium tetraisopropoxide, and titanium alkoxides;
   the second precursor material comprises one of platinum compounds and palladium compounds; and
   the third precursor material comprises one of silicon compounds, tungsten compounds, and palladium compounds including palladium chlorides.

10. The process according to claim 8, wherein:

the first precursor material comprises one of $TiCl_4$, $Ti(NO_3)_2$, or $Ti(SO_4)_2$, titanium acetates, titanium tetraisopropoxide, and titanium tetraethoxide;

the second precursor material comprises one of platinum chlorides, platinum acetates, tetraammineplatinum hydroxide, platinum alkoxides, platinum nitrate, and palladium chlorides; and the third precursor material comprises one of silicon halides, silicon chlorides, silanes, hexamethyldisiloxane, silicon alkoxides, tungsten halides, tungstates, tungsten alkoxides, tungsten acetates, tungsten nitrate; and palladium chlorides.

11. The process according to claim 8, wherein the third precursor material is one of a silicon compound and a tungsten compound; and at least one of the first and third precursor material is introduced into the reaction zone in or essentially together with an oxidizing atmosphere.

12. The process according to claim 11, wherein the oxidizing atmosphere is obtained by an addition of a gaseous oxidizing agent.

13. The process according to claim 8, wherein the second precursor material is introduced into the reaction zone in or essentially together with a reducing atmosphere.

14. The process according to claim 13, wherein the reducing atmosphere is obtained by an addition of a gaseous reducing agent to the reaction zone.

15. The process according to claim 14, wherein the gaseous reducing agent is one of hydrogen and methane.

16. A process of oxidizing exhaust gas constituents, comprising the step of using a catalyst according to claim 1 for oxidation of exhaust gas constituents including nitrogen oxide downstream of an internal combustion engine.

17. The process according to claim 16, wherein the step of using is for oxidation of nitrogen monoxide.

18. A coating comprising a catalyst according to claim 1 useful for application to ceramic or metallic catalyst substrates.

* * * * *